(12) United States Patent  
Richard (10) Patent No.: US 6,304,720 B1
(45) Date of Patent: Oct. 16, 2001

(54) HEAT SHRINKING HEAT GUN WITH FAN-SHAPED NOZZLE WITH TEMPERATURE AND/OR AIRFLOW VARIATION ALONG THE NOZZLE

(75) Inventor: Joseph Richard, Collinsville, VA (US)

(73) Assignee: Cpfilms Inc., Martinsville, VA (US)

( * ) Notice: Subject to any disclaimer, the term of this patent is extended or adjusted under 35 U.S.C. 154(b) by 0 days.

(21) Appl. No.: 09/377,159

(22) Filed: Aug. 19, 1999

(51) Int. Cl.⁷ ....................................................... F24H 3/00
(52) U.S. Cl. ........................... 392/385; 392/379; 239/601
(58) Field of Search ..................... 392/379, 382–385, 392/367; 239/560, 561, 568, 548, 553.5, 566, 499, 505, 500, 504, 553, 590.5, 590, 556, 601, 602; 156/499, 579; 53/557, 442; 34/96, 97, 98, 99, 652–656

(56) References Cited

U.S. PATENT DOCUMENTS

| | | |
|---|---|---|
| 1,932,703 | 10/1933 | Mancuso . |
| 2,306,100 * | 12/1942 | Williams .................................. 34/98 |
| 2,968,126 * | 1/1961 | Richardson .......................... 239/560 |
| 3,177,794 * | 4/1965 | Liang ................................. 239/590.5 |
| 3,747,746 * | 7/1973 | Newman et al. ....................... 53/442 |
| 3,837,581 * | 9/1974 | Orsoff ................................... 392/385 |
| 3,895,449 * | 7/1975 | Chance et al. ....................... 239/560 |
| 3,943,329 | 3/1976 | Hlavac . |
| 4,349,725 | 9/1982 | Sheridan . |
| 4,551,615 | 11/1985 | Wilson . |
| 4,562,689 * | 1/1986 | Hannen .................................. 53/557 |
| 4,643,839 | 1/1987 | Gilbertson . |
| 4,827,105 * | 5/1989 | Brown jr. ............................. 392/385 |
| 4,857,706 | 8/1989 | Diamond . |
| 4,999,928 | 3/1991 | Tozier . |
| 5,394,620 | 3/1995 | Chimera . |
| 5,642,462 * | 6/1997 | Huff ...................................... 392/382 |
| 5,671,321 | 9/1997 | Bagnuolo . |

FOREIGN PATENT DOCUMENTS

| | | | |
|---|---|---|---|
| 466897 * | 2/1969 | (CH) | ......................................... 34/96 |
| 154947 * | 6/1938 | (DE) | ..................................... 392/379 |
| 1136262 * | 9/1962 | (DE) | ................................... 53/373.9 |
| 2802685 * | 7/1979 | (DE) | ..................................... 392/379 |
| 2853197 * | 7/1979 | (DE) | ..................................... 392/384 |
| 3143500 * | 5/1983 | (DE) | ..................................... 392/379 |
| 128056 * | 12/1984 | (EP) | ....................................... 53/557 |
| 2046089 * | 11/1980 | (GB) | ..................................... 392/385 |
| 2161194 * | 1/1986 | (GB) . | |

* cited by examiner

Primary Examiner—John A. Jeffery
(74) Attorney, Agent, or Firm—Nixon & Vanderhye P.C.

(57) ABSTRACT

A heat gun nozzle and a method of using the nozzle includes a fan-shaped or wing-shaped flow of air having a temperature and/or airflow variation along the nozzle. This provides for a variation in the shrink rate when the fan-or wing-shaped airflow is applied to heat shrink plastic film. Both symmetric and asymmetric embodiments of the heat gun nozzle have an inlet portion mountable on a conventional heat gun outlet and an outlet portion providing the desired fan-shaped heat air flow with a duct portion connecting the two. In preferred embodiments, the nozzle outlet can be concave or convex depending upon the contour of the surface which is to be covered. The present invention also relates to the method of using such a heat gun nozzle permitting a substantial reduction in the number of heat gun passes required to successfully heat shrink film onto a compound curved surface.

48 Claims, 5 Drawing Sheets

HEAT SHRINKING HEAT GUN WITH FAN-SHAPED NOZZLE WITH TEMPERATURE AND/OR AIRFLOW VARIATION ALONG THE NOZZLE

BACKGROUND OF THE INVENTION

1. Field of the Invention

The present invention relates to the method of and apparatus for the custom fitting of heat shrinkable film to compound curvatures, specifically on automotive glass.

2. Discussion of Prior Art

In the past, window film installation on the interior surface of automotive glass having compound curves required the use of multiple strips of film. The strips varied in width depending upon the severity of the compound curve and the installer's capabilities. Attempting a one-piece rear glass or side quarter installation was the equivalent of trying to gift-wrap a basketball without wrinkling the paper. It just could not be done.

Various techniques were used including overlapping strips, straight or curved "butt-seams" (achieved by overlapping strips of film, cutting through both layers of the overlap, and then removing the severed strips), and apparently "seamless" installations in which the defroster elements were used as a cutting guide for relief cuts, thereby camouflaging the actual seams. More recently, such film installations have used a heat shrinkable film for heat forming a window film. In such applications, the film is first heat-formed on the exterior surface of the glass so as to smoothly lay on the compound curvature to be subsequently adhesively applied to the inside surface.

Figure 1A:
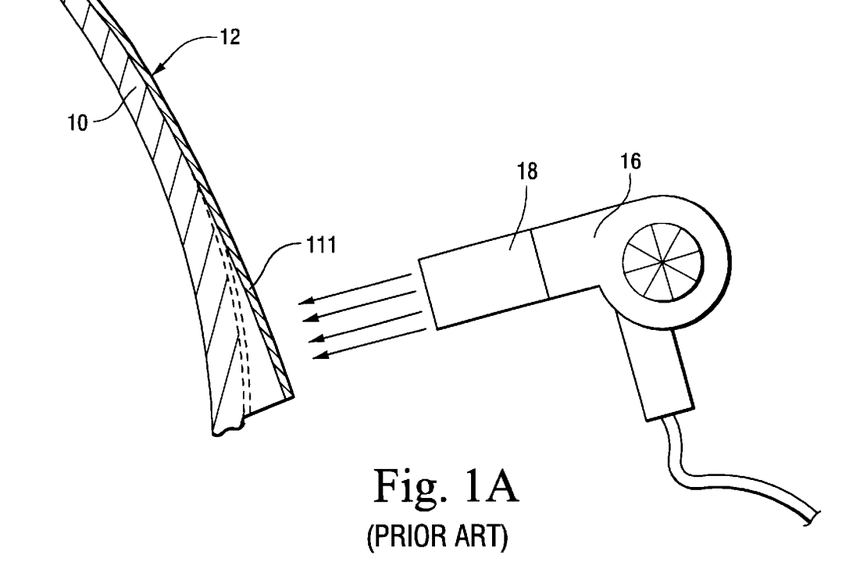
FIG. 1A is a side cross-sectional view representative of the prior art method and apparatus for installing heat shrinkable films.
Figure 1B:
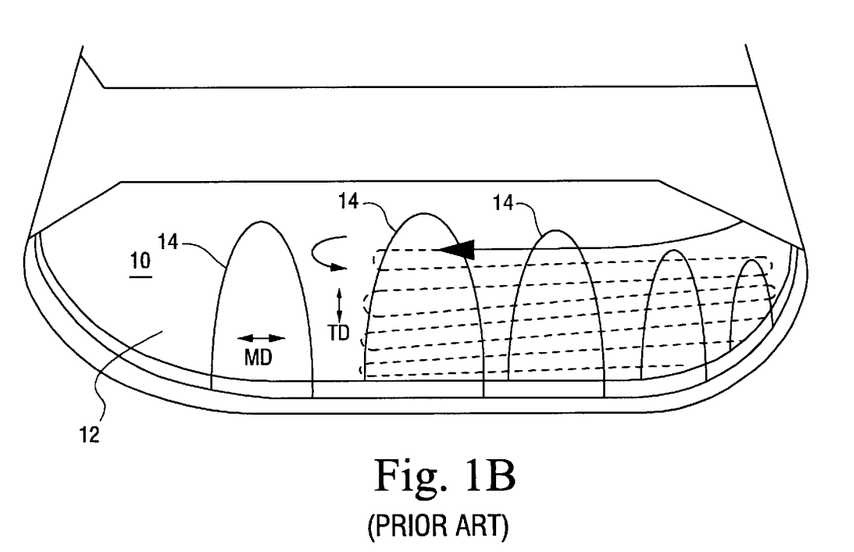
FIG. 1B is an upper perspective view of the heat gun movement pattern needed in the prior art installation process.

FIG. 1A illustrates a compound curved glass window 10, perhaps in an automotive application, to which film 12 is to be applied. FIG. 1B shows the window on which, due to the compound curvature of the glass and the essentially planar nature of the film 12, a number of scallop-shaped "fingers" or darts of film 14 have been formed. Where the film 12 is a heat shrinkable film, it can be shrunk in what is known as the "machine direction" (MD). The machine direction is the direction that the film is pulled through processing rollers during the manufacturing process causing a certain amount of stretch to be imparted to the film in the MD. Little or no stretch is provided to the film in the "transverse direction" (TD), i.e. the direction traversing the processing roller width, i.e. normally right angles to the MD. When the film is heated as during the heat-forming process, the film will tend to return to its original length upon cooling, thus shrinking depending upon the amount of heat applied, up to 4 or 5%, allowing the film to be shaped to a compound curved surface.

Thus, it can be seen that the fingers 14 formed by the planar film laying on the compound curved glass surface are shrunk by the application of hot air from a conventional heat gun 16. As one might expect, the output of such a heat gun is a stream of hot air that has a temperature well above the melting point of the plastic film. As a result, it is necessary for the operator to constantly move the heat gun around and over the surface of the plastic film, at controlled distances, so as to heat it up enough to shrink the film, but not get it so hot that it begins to melt, burn, or otherwise excessively deform.

Conventional application techniques involve a rapid circular motion combined with a transverse pattern of movement in the machine direction. This movement pattern is shown in FIG. 1B as the dotted line path where each of the dots may represent a smaller circular motion with subsequent movement in the transverse or machine direction to another point and a similar circular motion. The result of this movement is a gradual overall shrinkage of the film with a greater degree of shrinkage at the lower edge than in the middle of the film. As can be seen, the complex pattern of rotating and transverse movement of the heat gun is necessary to avoid undue shrinkage in any one spot caused by an inordinately high heat rate applied to that portion of the plastic film. As would be expected, a substantial period of time is required to learn the technique and the learning is mostly by trial and error, resulting in substantial film wastage.

There has been a long-felt need for a system to permit a more controlled application of heat to of heat-shrinkable films in order to facilitate their application to compound curves found in many automotive windows. While the use of heat-shrinkable film and the complex technique of shrinking that film to fit a compound curvature is relatively well known, the technique requires a substantial learning curve with the result that a substantial portion of film is lost or damaged during the various trial fittings until the technique is learned.

SUMMARY OF THE INVENTION

It is therefore an object of the present invention to provide an apparatus for more accurately distributing the heat generated by a conventional heat gun so as to reduce or eliminate repetitive movement of the heat gun over the various areas of a heat shrinkable film as well as increase the speed and accuracy of the shrinking process.

It is a further object of the present invention to provide a new method of heat shrinking film in which the need for multiple passes and constant movement of the heat gun is obviated, thereby making the method substantially easier for one to learn and systematically apply.

The above and other objects are achieved by providing an attachment for a heat gun which changes the heated air flow pattern from a columnar stream exiting the end of the gun to a fan-shaped flow which distributes the hot air in a more controlled fashion over the surface of the film to be variably shrunk. In preferred embodiments, the heated air flow has a temperature and/or air flow rate which varies along the length of a nozzle exit to effect the variable shrinkage. In one preferred embodiment, there is a higher volume flow rate and/or a higher temperature air flow close to a longitudinal axis of the heat gun outlet and a nozzle exit extends away from this center line to a lower volume air flow rate and/or cooler temperature air.

The result of the above structural combination is that a greater amount of heat is transferred to the plastic film which is closest to the heat gun's center line and a lesser amount of heat and heat-induced shrinkage occurs away from the center line. In a further preferred embodiment, the nozzle can be either symmetric or asymmetric and can have a nozzle exit which is curved in the plane of a longitudinal axis of the heat gun outlet so as to be either concave or convex and thereby conforming more accurately to the curved surface which is being fitted for the plastic film.

BRIEF DESCRIPTION OF THE DRAWINGS

The above and other objects will be more clearly appreciated by reference to the Figures appended hereto wherein.

DETAILED DESCRIPTION OF PREFERRED EMBODIMENTS

Figure 2A:
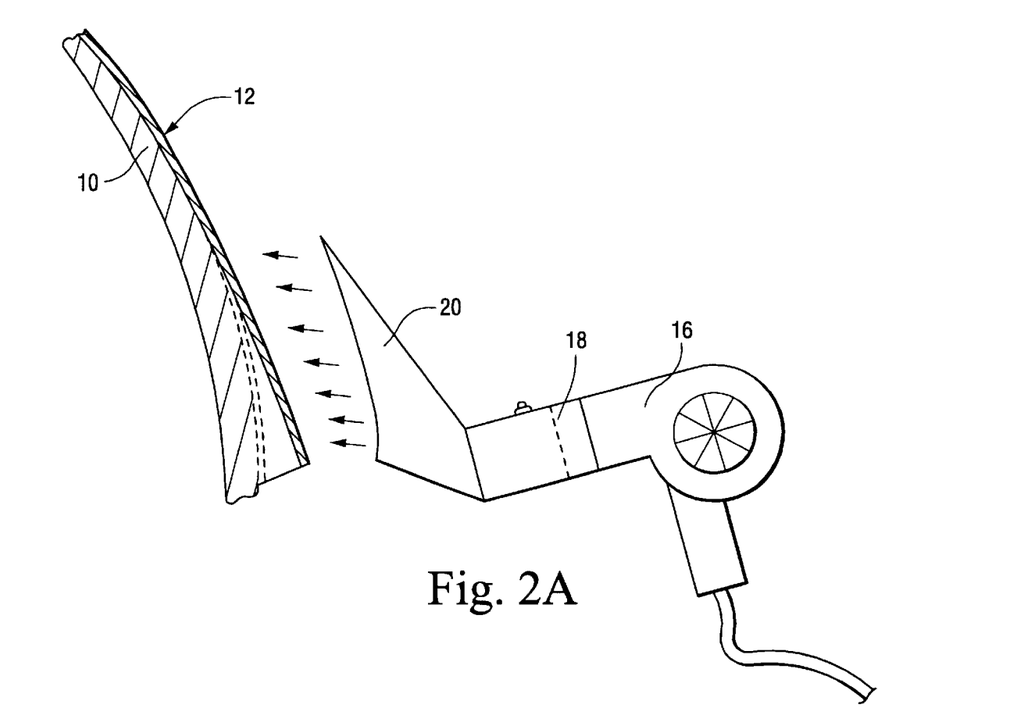
FIG. 2A is a side cross-sectional view showing the operation of a heat gun modified with a nozzle of the present invention.

Similar components will be identified by similar reference numbers throughout the separate views. The operation of the present invention is seen in FIG. 2A where the operation of the asymmetric nozzle 20 is shown (details of this nozzle will be discussed in conjunction with FIGS. 3A–3C).

The barrel of the heat gun 16 has its outlet 18 fitted with the inlet end of the nozzle which is slidably mounted thereon (it may be secured by set screw, clamps or other suitable structures). The nozzle, in a preferred embodiment, provides a variable temperature and variable flow rate heated air output which is applied to the film fingers 14. The air flow at the end of nozzle 20 which is closest to the center line of the heat gun outlet 18 is the hottest air flow and thus will convey the most amount of heat to the film not in contact with compound curved glass 10. This film is heated and immediately shrunk in the machine direction. The temperature of the heated air from the nozzle decreases along the exit slot of the nozzle attachment concomitantly with increasing distances from the center line of the heat gun outlet and as a result, the film is heated less and thus there is a lower amount of shrinkage.

Figure 2B:
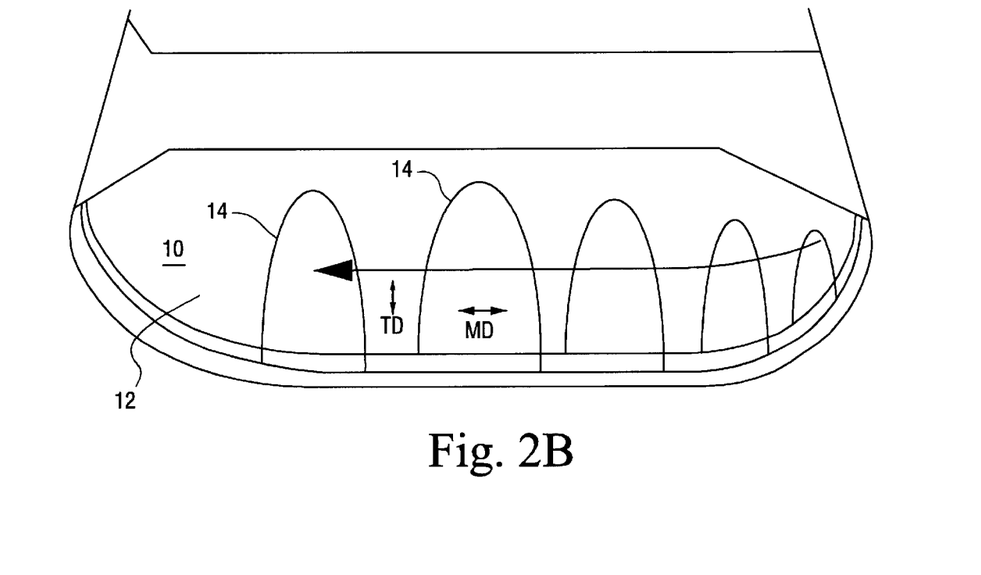
FIG. 2B is a rear perspective view of the heat gun movement pattern in accordance with the present method.

It can be seen from FIG. 2B that a greater amount of shrinkage is needed at the lower portion of film fingers 14 than is needed at the upper portion of the fingers and thus the varying temperature profile and/or air flow velocity profile in the asymmetric nozzle 20 will shrink the film fingers 14 throughout their length so as to achieve the exact amount of shrinkage necessary for the film to lay flat against the compound curved surface of glass 10. As can be seen, even though there are differences in the amount of shrinkage, a single path movement of the nozzle transversely in the machine directly across the film and fingers 14 (as shown by the bold transverse arrow in FIG. 2B) will cause the appropriate shrinkage which will eliminate any residual fingers. In a preferred method of operation, the nozzle is kept a fixed distance from the curved glass surface (along the length of the nozzle), as shown, to provide the desired variable heating rate of the plastic film.

Tests on the asymmetric nozzle have shown that it greatly reduces the expertise needed to properly shrink film to a compound curved surface with no more than a few passes of the heat gun nozzle in normal circumstances, and often with only a single, continuous pass. The details of the heat gun nozzle and variations thereon are shown in the subsequent drawings.

Figure 3A:
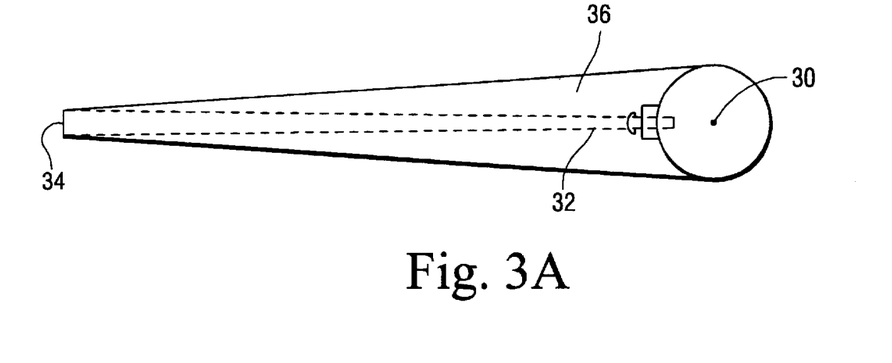
FIGS. 3A–3C are top, side and bottom views of an asymmetric nozzle in accordance with the present invention.
Figure 3B:
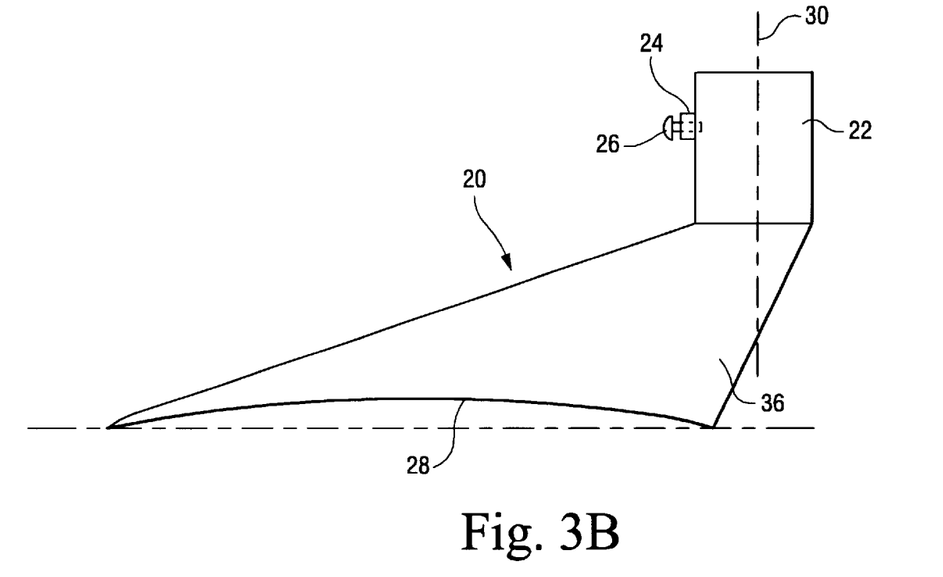

FIG. 3B illustrates a side view of the asymmetric heat gun nozzle 20 and it includes an inlet 22 which is slidably mounted on the heat gun outlet 18. A small threaded boss 24 may be welded on the side of inlet 22 with a screw 26 acting as a set screw to maintain the nozzle inlet in a desired fixed position on the heat gun outlet 18.

Figure 3C:
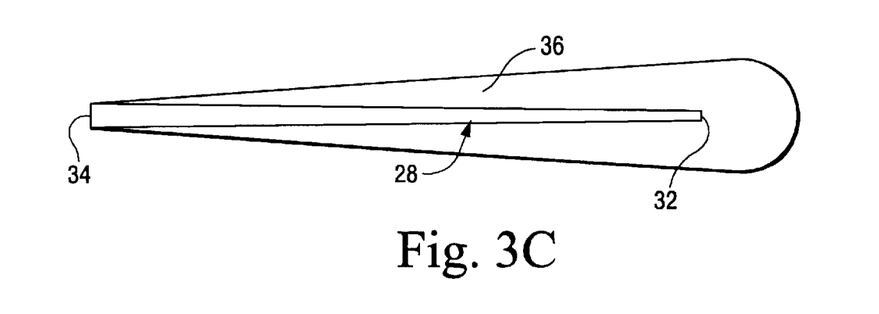

The asymmetric nozzle 20 also has an outlet which provides a desired fan-shaped flow of hot air. In a preferred embodiment, the nozzle outlet 28 is a slot which is narrower at the end closest to the heat gun outlet center line 30 and is wider at the opposite end (see end 32 nearest the heat gun outlet center line and end 34 away from the heat gun outlet center line). In a preferred embodiment, the nozzle outlet 28 is a slot which varies in width along its length. Connecting the asymmetric nozzle inlet 22 and the nozzle outlet 28 is a duct portion 36 which, in a preferred embodiment, smoothly transitions from the circular cross-section of the heat gun at the inlet 22 to the slot at the nozzle outlet 28.

As will be apparent from a reference to the relationship between the asymmetric nozzle inlet 22, duct portion 36 and outlet 28, if the slot were the same width along its length, the momentum of air flowing out of the heat gun outlet would provide an overabundance of high velocity, high temperature air at the end of the slot closest to the heat gun longitudinal center line. As a result, the nozzle outlet is narrowed at that end to restrict, to some extent, the air flow, although the air flow velocity at that point may be higher than the air flow velocity at the wider end 34. Additionally, the air exiting nozzle outlet 28 closest to the center line 30 will be the highest temperature air, with the lowest temperature air exiting the nozzle at the wider end 34.

It may also be helpful to have the asymmetric nozzle outlet curved in the plane of the longitudinal center line 30 so as to more easily conform to the compound curvature of the surface which is being worked. It will be seen that the asymmetric nozzle 20 has a concave curve with respect to the heat gun outlet, i.e., it is curved inwardly toward the heat gun outlet. In a preferred embodiment, the heat gun outlet cross-sectional area is greater than the asymmetric nozzle outlet's cross-sectional area so that heated air flow through the duct portion 36 is accelerated before leaving the nozzle. This change in cross-sectional area also aids in distributing heated air along the length of the asymmetric nozzle with the desired temperature distribution to affect varying rates shrinkage along the length of the film fingers 14. As noted above, the asymmetric nozzle with its concave outlet is useful in applying film to a compound curved surface which has a convex external surface.

Figure 4A:
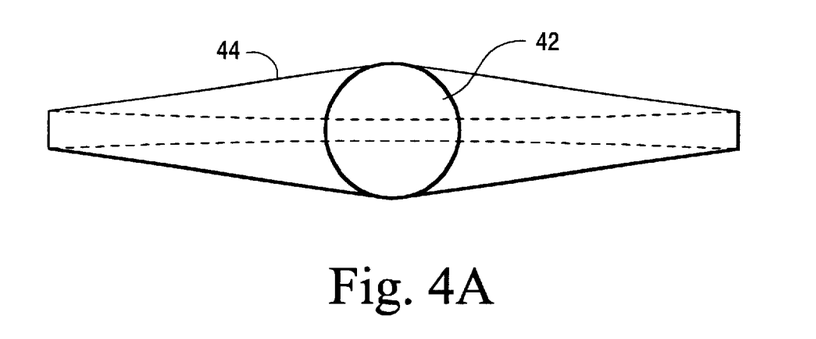
FIGS. 4A–4C are top, side and bottom views of a symmetric nozzle in accordance with the present invention.
Figure 4B:
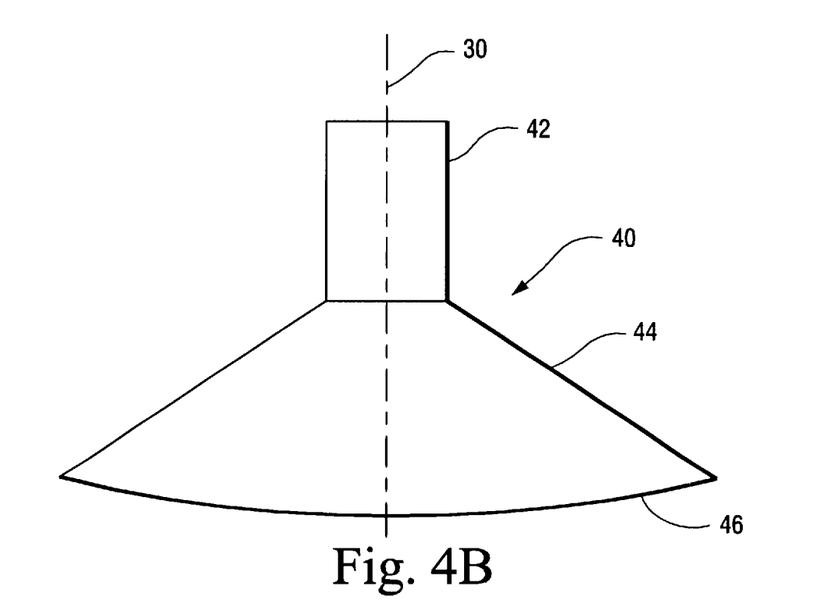
Figure 4C:
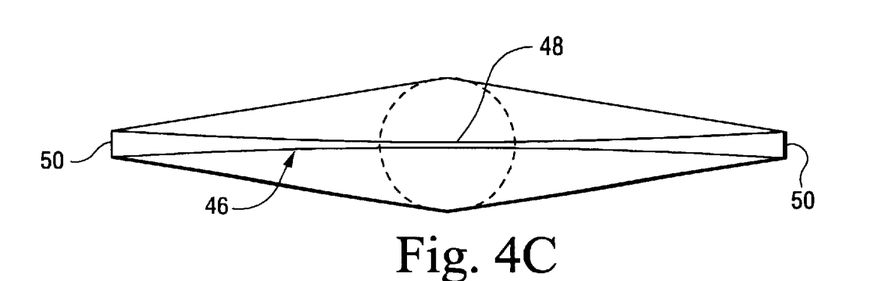

A further embodiment of the present invention, which is a symmetric nozzle 40, is shown in FIGS. 4A–4C. Like the asymmetric nozzle 20, the symmetric nozzle 40 has an inlet 42, a duct portion 44 and an outlet 46. The inlet would also be preferably slidably mountable on the heat gun outlet and could include any well-known structure to maintain its position (the set screw boss arrangement of the asymmetric nozzle has not been shown in conjunction with the symmetric nozzle).

The features of the symmetric nozzle are similar in structure and function to those in the asymmetric nozzle. The outlet 46 is comprised of a slot whose width varies across the nozzle from a narrow end 48 at or near the heat gun outlet longitudinal centerline 30 to the wider end 50 at the furthest extremities. This helps provide the desired temperature and velocity distribution along the nozzle that is required for film shrinkage in windows of a concave nature wherein film must be shrunk in more central regions of the glass rather than along its periphery.

Figure 5:
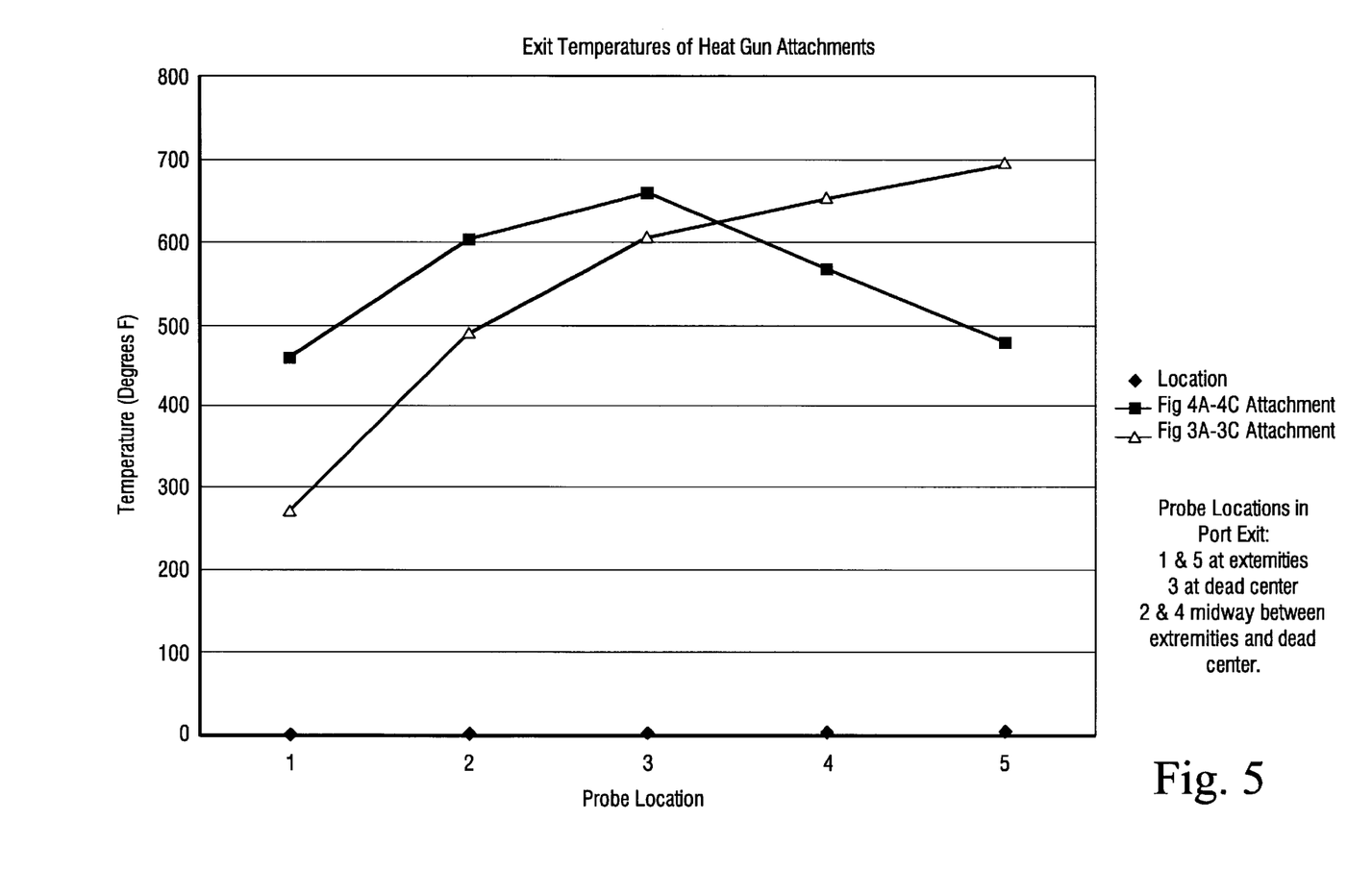
FIG. 5 is a graph of the temperatures measured at different points at the outlet of the nozzles of the preferred embodiments.

FIG. 5 shows the temperature distribution in the asymmetric nozzle shown in FIGS. 3A–3C, as well as the symmetric nozzle shown in FIGS. 4A–4C. As would be expected, the temperature is higher the closer one gets to the longitudinal centerline of the heat gun. The asymmetric nozzle has its highest temperature located at the narrow end 32 which is closest to the longitudinal center line 30 and the coolest temperature is at the wider end 34 (station 1). In the symmetric nozzle, the highest temperature is at the narrow portion 48 of the outlet slot and the coolest temperature is at the corresponding ends having the widest portion of the slot (stations 1 and 5).

Both the symmetric and asymmetric nozzles described above were made of 18 gauge stainless steel with a 3042B finish. A thinner gauge stainless steel (such as 20 gauge) could be used to make the nozzle somewhat lighter and there are obviously other materials such as high temperature plastics, etc. which could be advantageously used. In the preferred embodiments of each of FIGS. 3A–3C and 4A–4C, the overall length of the slot is 10 inches with the slot tapering from a ¼-inch width at the widest end to a ⅛-inch width at the narrowest end. The concave curvature shown in the FIG. 3B illustration is about ¼ of an inch. The convex curvature shown in the FIG. 4B embodiment is also about ¼ of an inch. The nozzle inlets are about 1½ inches in diameter, but can be varied to facilitate a sliding attachment onto any conventional heat gun. The duct portion between the end of the nozzle inlet and the beginning of the nozzle outlet is preferably between 2½ and 3 inches.

In view of the above, many variations and modifications of the asymmetric and symmetric heat gun nozzles will be readily apparent to those having ordinary skill in the art. The concave and convex curvatures of the nozzle outlets can be increased or decreased depending upon the curvature of the surface to which the film is to be fitted. The dimensions of a particular nozzle will vary depending upon the flow rate of the heat gun used and the desired temperature profile desired. Additionally, should a particular application require substantial changes in the temperature variation along the slot, internal baffles in the duct portion could increase or decrease the flow of heated air toward that portion of the nozzle outlet to achieve the desired result.

As a result, the present invention is not limited by the disclosure relating to the two embodiments shown and instead is limited only by the claims appended hereto.

What is claimed is:

1. An apparatus for facilitating the application of heat shrink plastic film to a curved surface where heat is applied to the plastic film in order to cause it to shrink and conform onto the curved surface, said apparatus including:

an electric heat gun producing a flow of heated air at an outlet;

a nozzle, mountable on said heat gun outlet, for conforming the flow of heated air into a fan shaped flow, said fan shaped flow having at least one of a variation in air temperature and air flow rate along the fan so as to provide a controlled amount of heat transfer to the heat shrink plastic film, wherein the nozzle includes:

an inlet having a longitudinal centerline and is slidably mountable on said heat gun outlet;

an outlet for said fan shaped flow of heated air to exit said nozzle; and a duct portion connecting said nozzle inlet to said nozzle outlet, said duct portion having a thickness dimension which decreases from said nozzle inlet to said nozzle outlet;

wherein said nozzle exit is a slot having a width and length, said length being greater than said width;

wherein said slot has a width that varies along the length.

2. The apparatus in accordance with claim 1, wherein said fan shaped flow varies in both temperature and flow rate to provide a constant heat to the film along the fan shaped flow.

3. The apparatus in accordance with claim 1, wherein the nozzle includes:

an inlet, slidably mountable on said heat gun outlet;

an outlet for said fan shaped flow of heated air to exit said nozzle; and a duct portion connecting said nozzle inlet to said nozzle outlet, said duct portion having a thickness dimension which decreases from said nozzle inlet to said nozzle outlet.

4. The apparatus in accordance with claim 3, further including set screw means for removably fixing said nozzle inlet on said heat gun outlet.

5. The apparatus in accordance with claim 3, wherein each of said heat gun outlet and nozzle outlet each have a cross-sectional area, and said heat gun outlet cross sectional area is greater than said nozzle cross-sectional area such that said heated airflow is accelerated during passage from said heat gun outlet to said nozzle outlet.

6. The apparatus in accordance with claim 3, wherein said nozzle exit is a slot having a width and length, said length being greater than said width.

7. The apparatus in accordance with claim 1, wherein said heated air flow has a velocity at said nozzle exit, and said heated air flow velocity varies along said nozzle exit.

8. The apparatus in accordance with claim 1, wherein said heated air flow velocity at said nozzle exit increases towards said longitudinal centerline.

9. The apparatus in accordance with claim 1, wherein said heated air flow has a temperature, and said air flow temperature varies along said nozzle exit.

10. The apparatus in accordance with claim 1, wherein said temperature is highest at a point closest to said longitudinal centerline.

11. The apparatus in accordance with claim 1, wherein said nozzle exit has a curvature in the plane of said longitudinal centerline.

12. The apparatus in accordance with claim 1, wherein said nozzle inlet has a longitudinal centerline and the duct portion of said nozzle has a symmetric shape so as to provide an equal amount of heated air on either side of said longitudinal centerline of said nozzle inlet.

13. The apparatus in accordance with claim 12, wherein each of said heat gun outlet and nozzle outlet each have a cross-sectional area, and said heat gun outlet cross sectional area is not greater than said nozzle cross-sectional area such that said heated airflow is not restricted during passage from said heat gun outlet to said nozzle outlet.

14. The apparatus in accordance with claim 12, wherein said nozzle exit is a slot having a width and length, said length being greater than said width.

15. The apparatus in accordance with claim 14, wherein said slot has a width that varies along the length.

16. The apparatus in accordance with claim 15, wherein said slot width is at a minimum at said longitudinal centerline.

17. The apparatus in accordance with claim 16, wherein said slot is about 10 inches long and has a width of about ⅛ inch at the closest point to said longitudinal centerline and a width of about ¼ inch at the furthest point from said longitudinal centerline.

18. The apparatus in accordance with claim 12, wherein said heated air flow has a velocity at said nozzle exit, and said heated air flow velocity varies along said nozzle exit.

19. The apparatus in accordance with claim 18, wherein said temperature is highest at a point closest to said longitudinal centerline.

20. The apparatus in accordance with claim 12, wherein said heated air flow velocity at said nozzle exit increases towards said longitudinal centerline.

21. The apparatus in accordance with claim 12, wherein said heated air flow has a temperature, and said air flow temperature varies along said nozzle exit.

22. The apparatus in accordance with claim 12, wherein said nozzle exit has a curvature in the plane of said longitudinal centerline.

23. The apparatus in accordance with claim 22, wherein said curvature is convex with respect to said heat gun outlet.

24. The apparatus in accordance with claim 1, wherein said slot width is at a minimum at said longitudinal centerline.

25. The apparatus in accordance with claim 24, wherein said slot is about 10 inches long and has a width of about ⅛ inch at the closest point to said longitudinal centerline and a width of about ¼ inch at the furthest point from said longitudinal centerline.

26. The apparatus in accordance with claim 1, wherein said nozzle is comprised of sheet metal.

27. The apparatus in accordance with claim 1, wherein said nozzle inlet has longitudinal centerline and the duct portion of said nozzle has an asymmetric shape so as to provide heated air on only one side of said longitudinal centerline of said nozzle inlet.

28. The apparatus in accordance with claim 27, wherein each of said heat gun outlet and nozzle outlet each have a cross-sectional area, and said heat gun outlet cross sectional area is not greater than said nozzle cross-sectional area such that said heated airflow is not restricted during passage from said heat gun outlet to said nozzle outlet.

29. The apparatus in accordance with claim 27, wherein said nozzle exit is a slot having a width and length, said length being greater than said width.

30. The apparatus in accordance with claim 27, wherein said nozzle exit has a curvature in the plane of said longitudinal centerline.

31. The apparatus in accordance with claim 30, wherein said curvature is concave with respect to said heat gun outlet.

32. The apparatus in accordance with claim 27, wherein said heated air flow has a velocity at said nozzle exit, and said heated air flow velocity varies along said nozzle exit.

33. The apparatus in accordance with claim 32, wherein said temperature is highest at a point closest to said longitudinal centerline.

34. The apparatus in accordance with claim 27, wherein said heated air flow velocity at said nozzle exit increases towards said longitudinal centerline.

35. The apparatus in accordance with claim 27, wherein said heated air flow has a temperature, and said air flow temperature varies along said nozzle exit.

36. An apparatus for facilitating the application of heat shrink plastic film to a curved surface where heat is applied to the plastic film in order to cause it to shrink and conform onto the curved surface, said apparatus including:

an electric heat gun producing a flow of heated air at an outlet;

a nozzle, mountable on said heat gun outlet, for conforming the flow of heated air into a fan shaped flow, said fan shaped flow having at least one of a variation in air temperature and air flow rate alone the fan so as to provide a controlled amount of heat transfer to the heat shrink plastic film, wherein the nozzle includes:

an inlet having a longitudinal centerline and is slidably mountable on said heat gun outlet;

an outlet for said fan shaped flow of heated air to exit said nozzle; and a duct portion connecting said nozzle inlet to said nozzle outlet, said duct portion having a thickness dimension which decreases from said nozzle inlet to said nozzle outlet;

wherein said nozzle inlet has a longitudinal centerline and the duct portion of said nozzle has a asymmetric shape so as to provide heated air on only one side of said longitudinal centerline of said nozzle inlet;

wherein said nozzle exit is a slot having a width and length, said length being greater than said width;

wherein said slot has a width that varies along the length.

37. The apparatus in accordance with claim 36, wherein said slot width is at a minimum at said longitudinal centerline.

38. The apparatus in accordance with claim 37, wherein said slot is about 10 inches long and has a width of about ⅛ inch at the closest point to said longitudinal centerline and a width of about ¼ inch at the furthest point from said longitudinal centerline.

39. The apparatus in accordance with claim 38, wherein said slot does not extend to said longitudinal centerline.

40. A method of shrinking a heat shrinkable plastic film to conform with a curved surface, said method comprising the steps of:

providing an apparatus for facilitating the application of heat shrink plastic film to a curved surface where heat is applied to the plastic film in order to cause it to shrink and conform onto the curved surface, said apparatus including:

an electric heat gun producing, a flow of heated air at an outlet;

a nozzle, mountable on said heat gun outlet, for conforming the flow of heated air into a fan shaped flow, said fan shaped flow having at least one of a variation in air temperature and air flow rate along the fan so as to provide a controlled amount of heat transfer to the heat shrink plastic film;

locating the plastic film on the curved surface; and applying to the film the fan shaped flow of heated air, using a transverse motion of the nozzle and moving from one edge of the film towards another edge of the film to gradually heat the film causing any loose portion of the film to shrink and tighten into conformity with said curved surface.

41. The method of shrinking a heat shrinkable plastic film accordingly to claim 40, wherein during said applying step, said nozzle is held about perpendicular to and at about a fixed distance from the nozzle to the film and said nozzle is moved continuously in the machine direction of the plastic film from said one edge to said another edge.

42. Apparatus comprising an electrically heated air gun and a nozzle for providing a fan-shaped flow of heated air from a slot, said slot having a length and a variable width, wherein the temperature of the air flowing from the slot varies along the length of the slot and wherein the slot width is at a minimum closest to the air gun.

43. Apparatus of claim 42 wherein the temperature variation along the length of the slot is in the range of from about 270 to about 700° F.

44. Apparatus of claim 42 wherein the temperature variation along the length of the slot is in the range of from about 450 to about 650° F.

45. Apparatus of claim 42 wherein the slot width is at a minimum near the center of the length of the slot.

46. Apparatus of claim 45 wherein the plane of said slot has a convex curvature with respect to the air gun.

47. Apparatus of claim 42 wherein the slot width is at a minimum at one end of the slot.

48. Apparatus of claim 47 wherein the plane of the slot has a concave curvature.

* * * * *

UNITED STATES PATENT AND TRADEMARK OFFICE
CERTIFICATE OF CORRECTION

PATENT NO.   : 6,304,720 B1
DATED        : October 16, 2001
INVENTOR(S)  : Joseph Richard It is certified that error appears in the above-identified patent and that said Letters Patent is hereby corrected as shown below:

<u>Title page,</u>
Item [73], Assignee,
"Cpfilms Inc." should read -- CPFilms Inc. --

Signed and Sealed this

Second Day of April, 2002

*Attest:*

JAMES E. ROGAN
*Attesting Officer*      *Director of the United States Patent and Trademark Office*